US011336514B2

(12) United States Patent
Medvinsky et al.

(10) Patent No.: US 11,336,514 B2
(45) Date of Patent: May 17, 2022

(54) SYSTEMS AND METHODS FOR SECURE PROVISIONING OF SSH CREDENTIALS

(71) Applicant: ARRIS Enterprises LLC, Suwanee, GA (US)

(72) Inventors: Alexander Medvinsky, San Diego, CA (US); Ali Negahdar, Duluth, GA (US); Jeffrey Dement, Hoffman Estates, IL (US); Daniel Torbet, Westminster, CO (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/132,364

(22) Filed: Dec. 23, 2020

(65) Prior Publication Data
US 2021/0306213 A1 Sep. 30, 2021

Related U.S. Application Data

(60) Provisional application No. 62/994,429, filed on Mar. 25, 2020.

(51) Int. Cl.
H04L 12/24 (2006.01)
H04L 9/08 (2006.01)
H04L 9/32 (2006.01)
H04L 41/0806 (2022.01)

(52) U.S. Cl.
CPC ........ H04L 41/0806 (2013.01); H04L 9/0825 (2013.01); H04L 9/0827 (2013.01); H04L 9/3263 (2013.01)

(58) Field of Classification Search
CPC . H04L 41/0806; H04L 9/0825; H04L 9/0827; H04L 9/3263
See application file for complete search history.

(56) References Cited

U.S. PATENT DOCUMENTS

| 7,506,368 B1* | 3/2009 | Kersey .................... H04L 9/321 726/12 |
| 2010/0040055 A1 | 2/2010 | Ford et al. |
| 2010/0091994 A1* | 4/2010 | Schiefelbein ........... H04L 63/20 380/277 |
| 2011/0066855 A1 | 3/2011 | Zeng et al. |
| 2015/0180726 A1 | 6/2015 | Asati et al. |
| 2018/0351926 A1 | 12/2018 | Negahdar |
| 2019/0273614 A1 | 9/2019 | Negahdar et al. |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jun. 24, 2021, by the International Application Division Korean Intellectual Property Office in corresponding International Application No. PCT/US2021/020782. (11 pages).

* cited by examiner

Primary Examiner — Azizul Choudhury
(74) Attorney, Agent, or Firm — Buchanan, Ingersoll & Rooney PC

(57) ABSTRACT

Embodiments relate to systems and methods for securely provisioning login credentials to an electronic device on a network, e.g., a consumer premises device (CPE) device, such as, among other devices, a modem. The login credential may be used, for example, for securely provisioning and configuring a CPE device.

20 Claims, 3 Drawing Sheets

SYSTEMS AND METHODS FOR SECURE PROVISIONING OF SSH CREDENTIALS

TECHNICAL FIELD

Embodiments relate to systems and methods for securely provisioning login credentials to an electronic device on a network, e.g., a consumer premises device (CPE) device, such as, among other devices, a modem. The login credential may be used, for example, for securely provisioning and configuring a CPE device.

BACKGROUND

An internet service provider or multiple service operator (MSO) may deliver media content and/or internet services to subscribers/viewers. Media content and internet data services are frequently provided via consumer premise equipment (CPE) in a consumer's home or business, for example CPE may include a network gateway device (modem) supported by the MSO. In common scenarios, CPE devices receive video service(s) and/or data service(s) from a wide area network (WAN) via a connection to a subscriber network. The subscriber network, for example, can be a coaxial cable network, a hybrid fiber-coaxial (HFC) network, a local area network (LAN), a wireless local area network (WLAN), a cellular network, a personal area network (PAN), as well as others.

In common embodiments, the CPE is a modem, although CPE may comprise a variety of network connected devices providing a variety of services. For example CPE may include a cable modem (CM) or other gateway device, security systems, voice system (IP telephones), set top boxes and other video streaming devices, and various internet-connected household appliances.

A modem is a device that converts data into a format suitable for a certain transmission medium, facilitating data transmission to and from separate communication devices. A modem operates by modulating one or more carrier wave signals to encode digital information from a transmitting communication device for transmission of the encoded carrier wave signal through a transmission medium. A second modem associated with a receiving communication device demodulates the encoded carrier wave signal to decode the digital information for use by the receiving communication device. Typically, modems are used in communication systems in which a first communication device is configured to communicate with a second communication device, where each communication device generates and receives digital information but that digital information is more efficiently transmitted via an analog signal. Conversion of the digital information to and from the carrier wave is done so that the digital information can be transmitted efficiency through the transmission medium and decoded in a reliable manner, thereby facilitating reproduction of the original digital information.

Modems can function as gateways (e.g., network nodes equipped to interface a communication device operating on a first communication protocol with a communication device operating on a second communication protocol). An example of a communication protocol can be an Internet protocol suite, which typically includes the Transmission Control Protocol and the Internet Protocol (TCP/IP). Because a modem can operate as a gateway, it may be beneficial to configure the modem to implement specific communication protocols and security features when operating. This may be done to provide more tailored operational control for the information being received and transmitted via user's communication device to which the modem is operatively associated.

In an exemplary communication architecture, a first communication device (e.g., a computer) will be connected to a first modem, a second communication device (e.g. a computer) will be connected to a second modem, and the first modem and second modem will be configured to transmit and receive signals to and from each other via a transmission medium (e.g., electrical wire, telephone line, co-axial cable, optical fiber, etc.). The first communication device can generate digital information and the first modem can modulate the digital information to encode it into a carrier wave. The first modem can transmit the carrier wave to the second modem, where the second modem demodulates the carrier wave to reproduce the digital information, which is then transmitted to the second communication device. The communication protocol facilitating the transmission of signals between the two communication devices will be TCP/IP. Any of the first and/or second modems' Internet communication protocols and security features can be configured to allow a user of the first communication device or a user of the second communication device to set operational and security parameters by which their respective communication devices will receive and/or transmit information to the other communication device, allow or prevent other first or second communication devices to join the communications network, set validation protocols for security measures, etc.

For example, in a typical HFC network, the first modem may be a CPE CM in a subscriber's home and the second modem may be a cable modem termination system (CMTS), typically located in a MSO's headend or hubsite, which is used to provide high speed data services, such as cable Internet or Voice over Internet Protocol, to cable subscribers. A CMTS is essentially a modem and router with Ethernet interfaces (connections) on one side and coaxial cable RF interfaces on the other side. The RF/coax interfaces carry RF signals to and from the subscriber's CM. A CMTS provides many of the same functions provided by the DSLAM in a DSL system, and other forms of subscriber network use analogous intermediate communication devices to connect CPE to the MSO network. On the subscriber side of the headend, the CMTS enables the communication with subscribers CMs.

Thus, an exemplary communication architecture may comprise a MSO server which communicates through a WAN internet connection with an intermediate communication device, such as a CMTS, that in turn communicates directly with CPE, such as a CM, which acts as a gateway to a CPE LAN and additional CPE, such as computers and internet appliances in a subscriber's home. The CPE devices can include, for example, a modem, a set-top box, a wireless router including an embedded modem, or a media gateway, among many others (e.g., digital subscriber line (DSL) modem, voice over internet protocol (VOIP) terminal adapter, video game console, digital versatile disc (DVD) player, communications device, hotspot device, etc.).

In such a context, it is advantageous for MSO technicians to be able to remotely issue commands to CPE using a secure protocol such as SSH, for example to investigate a customer-reported technical problem or suspected unauthorized actions by a subscriber. Protocol such as SSH can be abused to intentionally reconfigure the modem, increase bandwidth utilization without proper authorization and payment, etc. Therefore such a protocol requires a high level of security. To facilitate secure communications, the MSO can provision login credentials to CPE to permit the MSO to login to a secure server hosted by the CPE, or alternatively to permit the CPE device to login to a secure server (e.g., a provisioning server) to retrieve configuration files. However, to enhance security while provisioning such log in credentials, methods are needed to increase the confidence of the MSO that it is communicating directly with the intended CPE device.

SUMMARY

The systems and methods disclosed herein relate to systems and methods for secure provisioning of login credentials, such as SSH credentials, into CPE devices. According to common industry practices, provisioning of cable modem SSH credentials is done through SNMP transport. SNMP could be fully secured with SNMPv3 security, but often it is not because cable operators do not implement SNMPv3 security. It would be advantageous to have an alternative method to secure SSH credentials provisioning while utilizing an insecure version of SNMP. In addition to secure provisioning of user's SSH credentials, SSH server public key that is installed on a cable modem also has to be authenticated or validated by an MSO Provisioning Application that it belongs to a specific cable modem. In exemplary embodiments, a system can be configured to utilize a secure server (e.g., comprised within a provisioning system) and an encrypted message containing server SSH key. In another exemplary embodiment, a system can be configured to utilize the cable modem's BPI+ public key from its BPI+ certificate as the SSH Server public key. Cable modem's certificate chain can fully validate this public key. This method may be simpler but also less flexible as it does not allow updating the SSH Server's public key without also updating its BPI+ certificate.

Accordingly, in exemplary embodiments, this disclosure provides a method for increasing the security of communications between a server and a remotely located network device. In various embodiments, the server is connected through a first communications medium to an intermediate network device, and the intermediate network device is connected through a second communications medium to the remotely located network device. In various embodiments, communications between the server and the remotely located network device pass through the intermediate network device. Generally, the remotely located network device has an address, a public key, and one or more digital certificates containing the address and public key. The intermediate network device is configured to use the address and public key of the remotely located network device to establish communications with the remotely located network device.

For example, each CM contains an X.509 certificate, installed at the time of manufacture. The certificate contains the modem's public key, its 48-bit address, a manufacturer ID, and a device serial number. The certificate is signed by the modem manufacturer. This allows a CMTS, when it is presented with the certificate, to authenticate the modem. When the CM initializes and connects to the CMTS, the CM sends the certificate to the CMTS and the CMTS authenticates the CM. The CM address and CM public key are used to establish communications during the initialization process. For example, a CMTS uses the MAC address of a CM to direct communications traffic to the CM and uses the CM public key during the initialization process to encrypt an authorization key transmission.

The remotely located network device (i.e., CPE device) such as a cable modem generally comprises a processor configured to transmit, in response to a request, one or more digital certificates. Exemplary configurations for this purpose include the simple network management protocol (SNMP), an Internet Standard protocol for collecting and organizing information about managed devices on IP networks and for modifying that information to change device behavior. Devices that typically support SNMP include cable modems, routers, switches, servers, workstations, printers, and more. A GetRequest in SNMP is a manager-to-agent request to retrieve the value of a variable or list of variables. A Response with current values is returned. A SetRequest is a manager-to-agent request to change the value of a variable or list of variables. Although version 3 of SNMP (SNMPv3) added cryptographic security, it is not always implemented. Accordingly, another means of establishing secure communications between a manager and an agent for purposes of remote configuration may be required.

The method disclosed herein may include a server (e.g., a server operated by an MSO such as a provisioning server) requesting one or more digital certificates from the remotely located network device (e.g., CPE such as a CM). The remotely located network device transmits the one or more digital certificates to the server. The server verifies validity of the one or more digital certificates received from the remotely located network device and extracts the address and public key of the remotely located network device from the one or more digital certificates. Then the server requests, from the intermediate network device (e.g., the CMTS that is connected to a CM), the public key of the remotely located network device which is currently active and online that is associated with the address of the remotely located network device. In a DOCSIS system, for example, the CMTS will have received the CM public key during initialization of the CM. The intermediate network device responds by transmitting the public key of the remotely located network device to the server. The server can now verify that the public key extracted from the digital certificate(s) received from the remotely located device matches the public key that is known to the intermediate network device, e.g. that the CM public key in the CM's X.509 certificate matches the CM public key used by the CMTS to communicate with the CM. This step also validates that remotely located device is currently connected to the intermediate network device. (In other words, the remotely located device is not utilizing a stolen copy of a digital certificate and private key, connecting to the server through some alternate means in order to steal SSH client credentials.) If the certificates match, the server can use the public key to send an encrypted message to the remotely located network device through the intermediate network device. Advantageously, that message can comprise log in credentials, such as SSH credentials, that can be used to configure a SSH server operated on the remotely located network device. Those SSH credentials then can allow an MSO to use a provisioning server, or another device, to log in to the remotely located network device to perform actions including changing configuration settings and updating software in order to fix or diagnose a technical issue. Alternatively, the credentials may be credential to be used by the remotely located network device to initiate secure communications to a centralized server, for example to obtain automated updates, or simply to perform functions of the remotely located network device, for example secure transmission of data.

As will be appreciated, in exemplary embodiments, the server is a provisioning server, the intermediate network device is a cable modem termination system, and the remote network device is a cable modem located in a customer premises. The message from the server to the remote network device advantageously can comprise credentials for a secure communications protocol, such as SSH credentials. In some embodiments, the message from the provisioning server to the cable modem is encrypted using the cable modem public key and comprises credentials for a secure communications protocol, and the cable modem is configured to operate a secure server using the credentials for receiving configuration settings. In some embodiments, the credentials for a secure communications protocol are credentials for a SSH server, and a cable modem can be a processor configured to operate an SSH server for receiving configuration settings and or commands for execution by the processor of the cable modem.

In various embodiments, an apparatus (e.g., a provisioning server) for communicating with a remotely located network device (e.g., a CM) is disclosed wherein the apparatus is connected through a first communications medium to an intermediate network device (for example a CMTS), and the intermediate network device is connected through a second communications medium to the remotely located network device so that communications between the apparatus and the remotely located network device pass through the intermediate network device. Generally, the remotely located network device has an address, a public key, and one or more digital certificates containing the address and public key (e.g., an X.509 certificate in an implementation of the BPI+ protocol, or the like) and the intermediate network device is configured to use the address and public key of the remotely located network device to establish communications with the remotely located network device. The remotely located network device is configured to transmit, in response to a request, the one or more digital certificates, for example in an implementation of the SNMP protocol.

In various embodiments the apparatus can comprise a processor, and a memory, communicatively coupled to the processor, the memory storing instructions for carrying out the following procedures. Requesting the one or more digital certificates from the remotely located network device. Receiving from the remotely located network device the one or more digital certificates. Verifying validity of the one or more digital certificates received from the remotely located network device. Extracting the address and public key of the remotely located network device from the one or more digital certificates. Requesting, from the intermediate network device, the public key of the remotely located network device having the address of the remotely located network device. Receiving from the intermediate network device, the public key of the remotely located network device having the address of the remotely located network device. Verifying that the public key extracted from the one or more digital certificates matches the public key received from the intermediate network device, and then sending an encrypted message to the remotely located network device through the intermediate network device, wherein the encrypted message is encrypted using the public key of the remotely located network device.

As will be appreciated the apparatus can comprise a provisioning server, the intermediate network device can be a cable modem termination system, and the remote network device can be a cable modem located in a customer premises. The message from the apparatus to the remote network device can comprise credentials for a secure communications protocol, for example SSH credentials. In various embodiments, a cable modem can be configured to operate a secure server for receiving configuration settings using the credentials that are transmitted by the apparatus.

Also disclosed herein is a non-transitory computer readable medium comprising instructions operable to cause one or more processors to perform operations, comprising: requesting one or more digital certificates from a remotely located network device, wherein the remotely located network device has an address, a public key, and the one or more digital certificates contain the address and public key, receiving from the remotely located network device the one or more digital certificates, verifying validity of the one or more digital certificates received from the remotely located network device, extracting an address and public key of the remotely located network device from the one or more digital certificates, requesting, from an intermediate network device, a public key of the remotely located network device having the address of the remotely located network device, wherein the apparatus is connected through a first communications medium to the intermediate network device, the intermediate network device is connected through a second communications medium to the remotely located network device, and communications between the apparatus and the remotely located network device pass through the intermediate network device, receiving from the intermediate network device, the public key of the remotely located network device having the address of the remotely located network device, verifying that the public key extracted from the one or more digital certificates matches the public key received from the intermediate network device, and sending an encrypted message to the remotely located network device through the intermediate network device, wherein the encrypted message is encrypted using the public key of the remotely located network device.

DETAILED DESCRIPTION

In initially provisioning CPE, it may be necessary for an ISP or MSO to access and set configuration settings in the CPE so that the equipment will operate in accordance with technical and policy requirements. It may also be advantageous for a MSO to be able to deploy updated software to CPE through the subscriber network. As another example, a user's configuration settings for a CPE device can trigger a service problem, e.g., a modem is prevented from operating, or operating properly, and it may be advantageous for an MSO to be able to remotely reconfigure CPE to resolve such problems.

Communication between the MSO and a CM or other CPE can be securely facilitated using a variety of secure communications protocols. Part of this process is enabling a secure point of entry into the CPE (e.g. via a secure shell (SSH) or secure hypertext transfer protocol (HTTPS)). For example, the SSH protocol is a method for secure remote login from one computer to another. It provides several alternative options for strong authentication, and it protects the communications security and integrity with strong encryption. It is a secure alternative to non-protected login protocols (such as telnet, rlogin) and insecure file transfer methods (such as FTP). Options that can be used for user authentication include using passwords and public keys as credentials. With public key authentication, a private key serves as an authentication credential. This method works by sending a signature created with a private key of the user. The server checks that the key is a valid authenticator for the user, and checks that the signature is valid. If both hold, the authentication request is accepted; otherwise, it is rejected. A server may require additional authentications after successful authentication. In the password method, a plaintext password is included in an authentication request, however, the entire authentication request packet is encrypted in the transport layer.

The systems and methods described herein provide for the secure provisioning of login credentials, e.g., SSH credentials, from an MSO server (e.g., a provisioning server) to CPE clients such as a cable modem. In the following, the description will use provisioning of SSH credentials to a CM connected via an HFC as an exemplary embodiment. It will be appreciated that the system and methods may be extended to provide secure provisioning of login credentials to any of a wide variety of CPE devices connected over a variety of mediums. A person of ordinary skill in the art will also appreciate that the methods and systems described herein can be adapted to other networks for the secure provisioning of login credentials to deployed communication devices, for example wireless networks (cellular data networks, LTE, 5G, satellite, etc.), optical fiber networks, and the like.

Figure 1:
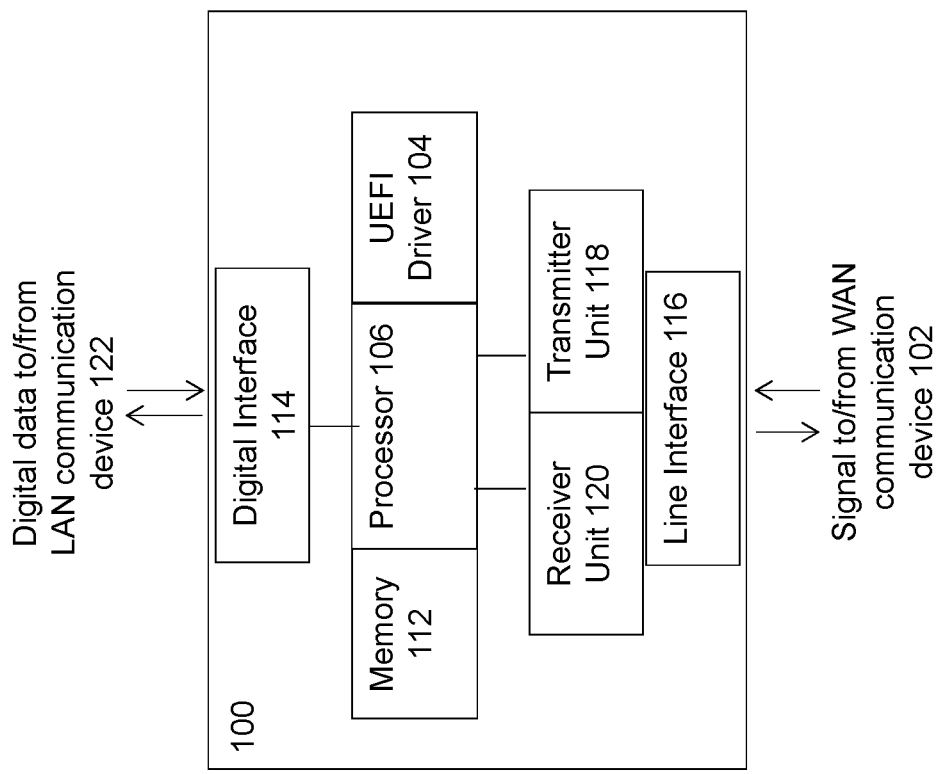
FIG. 1 shows an exemplary block diagram of a hardware architecture for an embodiment of a CPE device, for example a CM.
Figure 2B:
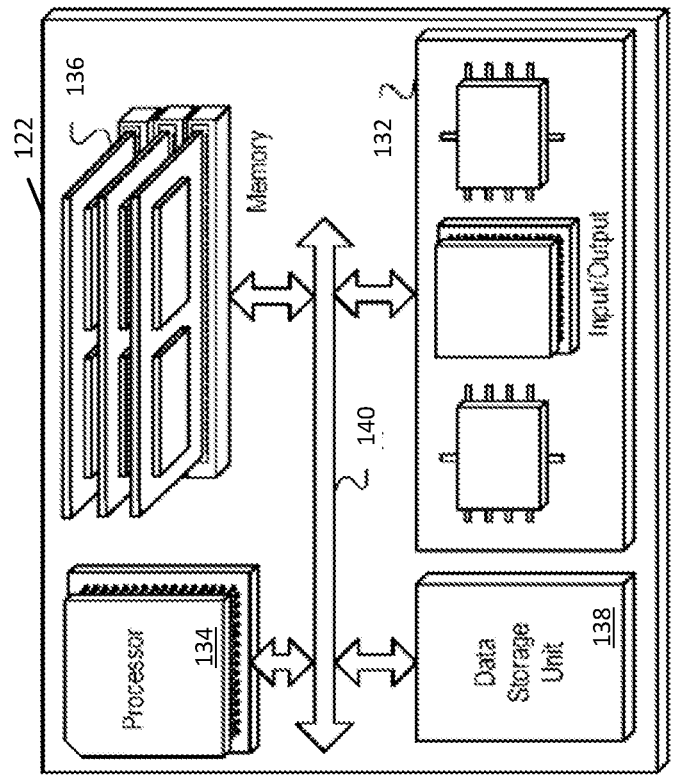
FIG. 2B illustrates a block diagram of components that may be present in the various devices in a DOCSIS Network.
Figure 2A:
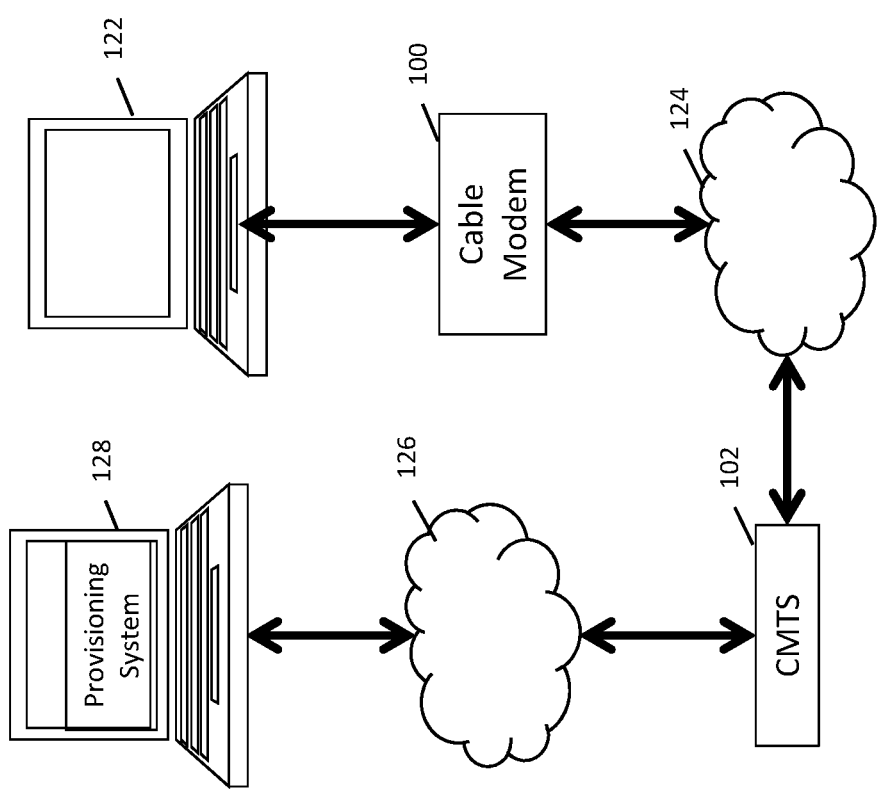
FIG. 2A is an exemplary block diagram of devices that may be present in a Data Over Cable Service Interface Specification (DOCSIS) Network.

Referring to FIGS. 1-2A, embodiments of the systems and methods disclosed herein can be used in the context of a DOCSIS network and the CPE can be a CM. A modem (e.g., a CM) 100 can have a housing 110 configured to contain operating modules for the modem 100. These operating modules can include a processor 106 in operative association with a memory 112, a digital interface 114, a line interface 116, a transmitter unit 118, and a receiver unit 120. The processor 106 can be configured to execute software (e.g., operating system software) and firmware stored on the memory 112. The processor 106 can be a central processing unit (CPU), for example. The memory 112 can include volatile memories and non-volatile memories. The non-volatile memories can include a Not Or (NOR) flash memory, a Not And (NAND) flash memory, and a Non-Volatile Random Access Memory (NVRAM) memory. The digital interface 114 can include integrated circuitry configured to receive and transmit digital data to and from a communication device 122 on a LAN. Communication device 122 may be, for example, a customer's computer, a set top box, smart TV, or internet-of-things (IOT) device such as a thermostat, security system, etc. The processor 106 can receive the digital data from the digital interface 114 and encode the data. The transmitter unit 118 can include integrated circuitry configured to generate a carrier signal, receive the encoded data from the processor 106, and modulate the carrier signal with the encoded data. The transmitter unit 118 can transmit the modulated carrier signal to the line interface 116. The line interface 116 can include integrated circuitry configured to transmit the modulated carrier signal to a transmission medium (e.g., wireless radio, electrical wire, telephone line, co-axial cable, optical fiber, etc.).

The modulated carrier signal may travel though at least one communication network 124 to a WAN communication device 102, e.g. a CMTS in the context of a DOCSIS network. The modem 100 and the second communication device 102 can be configured to transmit and receive signals to and from each other via at least one communication network 124. The modem 100 can receive a modulated carrier signal via its line interface 116. The receiver unit 120 (having integrated circuitry configured to demodulate the carrier signal) of the receiving modem 100 can demodulate the carrier signal and extract the encoded digital data. The encoded digital data can be transmitted to the receiving modem's processor 106 where the original digital data is reproduced. The original digital data is then transmitted to the receiving modem's digital interface 114, where the original digital data is transmitted to the second communication device 122.

The digital interface 114 and/or the line interface 116 can also include ports, couplings, and/or connectors (any of which may include data communication equipment (DCE) or data terminal equipment (DTE)) to facilitate electrical and/or optical connection to a communication device 122 via telephone lines, Transmission System-1 (T1) lines, Integrated Services Digital Network (ISDN) lines, etc.

In some embodiments, a Unified Extensible Firmware Interface (UEFI) driver 104 of the modem 100 can be a software module or engine configured to define a software interface between the modem's 100 operating system and its firmware. For instance, embodiments of the UEFI driver 104 can be programmed to run a boot loader operation. When the modem 100 is turned off, the modem's 100 software is typically stored in non-volatile memory 112. When the modem 100 is turned back on (i.e., booted), it does not have immediate access to that software, and so the boot loader executes a program to start a sequence that will pull data and programs from the non-volatile memory. After the boot sequence is completed, the processor 106 of the modem 100 then "kernels" into memory 112 for execution of the operating system. This boot loader can operate in stages, wherein several programs of increasing complexity are loaded. In some embodiments, the UEFI driver 104 and a configuration driver can work in conjunction to cause the boot loader to pull information from the configuration settings stored in the modem's 100 memory 112 while the modem 100 is booting up.

In an exemplary embodiment, the modem's 100 memory 112 includes a set of default communication protocol settings. These default communication protocol settings are stored in the modem's 100 memory 112, and are used to allow the modem 100 to perform its communication functions. For instance, if the modem 100 is used for Internet communications, the default communication protocol settings will include an Internet protocol suite (e.g., a TCP/IP). These default communication protocol settings can be part of the default configuration settings for the modem 100. As noted herein, a MSO may desire to modify or tailor the modem's 100 configuration settings. This can involve transmitting communications protocol settings to a modem. Typical communication protocol settings can include any one or combination of: 1) Internet connection type settings; 2) Internet username and password settings; 3) Maximum Transmission Units (MTUs) settings; 4) Network or connection modes (e.g., always on, manually connect, etc.) and operating bans settings; 5) Domain Name System (DNS) server settings; 6) Data Source Name (DSN) settings, 7) dial-up settings; and 8) link monitor settings; 9) establishing a guest network settings. Typical security features can include any one or combination of: 1) firewall settings; 2) security type settings; 3) remote administration settings; 4) Universal Plug and Play (UPnP) settings; 5) Service Set Identifier (SSID) settings; 6) Private Wireless Fidelity (Wi-Fi) Network settings; 7) IP address, protocol (UDP vs TCP) and port filter settings and port forwarding; 8) Dynamic host Configuration Protocol (DHCP) settings; and 9) parental control settings. The lists of communication protocols and security features settings presented above are exemplary only; and are not intended to limit the systems and methods disclosed herein to these lists.

The modem 100 architectures and operations described above are exemplary only. It is understood that other modem 100 architectures and operational constraints can be used. It is further understood that any of the modems 100 can include other circuitry and operating modules, such as data compressors, buffers, scramblers, clocks, filters, analog to digital converters, signal processors, etc. to improve or tailor the functionality of the modem 100 and/or facilitate meeting a desired design objective for the modem 100.

Referring to FIG. 2A, embodiments of the modem 100 disclosed can function as a gateway so as to provide a network node equipped to interface a first communication device 122 operating on a first communication medium and/or protocol with a second communication device 102 operating on a second communication medium and/or protocol. In some embodiments, communication device 102 can likewise act as an intermediate network device between CPE devices and MSO servers, for example communicate through a network 126 with a provisioning system 128.

A provisioning system can comprise one or more servers, which might be hosted on one device or more than one device, and that provide configuration and support to network devices including CPE devices such as modem 100 and communication device 122. For example, DHCP servers provide the CM with initial configuration information, including IP address(es), when the CM boots. A Config File server may send configuration files to CMs when they boot. Configuration files permit the configuration of the CM's parameters and can be provided in any suitable format that can be read by the CM. A Software Download server may be used to download software upgrades to the CM. A Time Protocol server can provide Time Protocol clients, typically CMs, with the current time of day. A Certificate Revocation server may define certificate status. A Network Management System (NMS), hosted on the same or one or more separate devices, may comprise a SNMP Manager allowing an operator to configure and monitor SNMP Agents, typically the CM and the CMTS, a Syslog server that can collect messages pertaining to the operation of devices, and an IPDR Collector server allowing the operator to collect bulk statistics in an efficient manner.

FIG. 2B shows an exemplary architecture for any one or combination of the communication device 122, CM 100, CMTS 102, or server 128. as an example, a first communication device 122 can be a computer, a broadband device, a multimedia device, thermostat, security system, etc. The communication device 122 can include an input/output device 132 configured to provide input/output operations for the communication device 122. In some embodiments, the input/output device 132 can include driver devices configured to receive input data and send output data to the modem 100, send communications to, and receive communications from, various networks, and/or translate data into visual or audio signals for presentation to a user.

The communication device 122 can include a processor 134, a memory 136, a storage device 132, and the input/output device 126. Each of the components 128, 130, 132, and 126 can, for example, be interconnected using a system bus 140. The processor 134 is capable of processing instructions for execution within the communication device 122. The processor 134 can be a single-threaded processor or a multi-threaded processor. The processor 134 is capable of processing instructions stored in the memory 136 or on the storage device 138. The memory 136 stores information within the communication device 122. The memory 136 can be a computer-readable medium, a volatile memory unit, a non-volatile memory unit, etc. The storage device 138 is capable of providing mass storage for the communication device 122. The storage device 138 can comprise one or more of a computer-readable medium, a hard disk device, an optical disk device, flash memory, or some other large capacity storage device.

The communication device 122, and components thereof, can also be realized by instructions that, upon execution, cause one or more processing devices to carry out the processes and functions embedded in software stored within the memory 130 or storage device 132. Such instructions can, for example, comprise interpreted instructions, such as script instructions, e.g., JavaScript or ECMAScript instructions, executable code, and/or other instructions stored in a computer readable medium.

Figure 3:
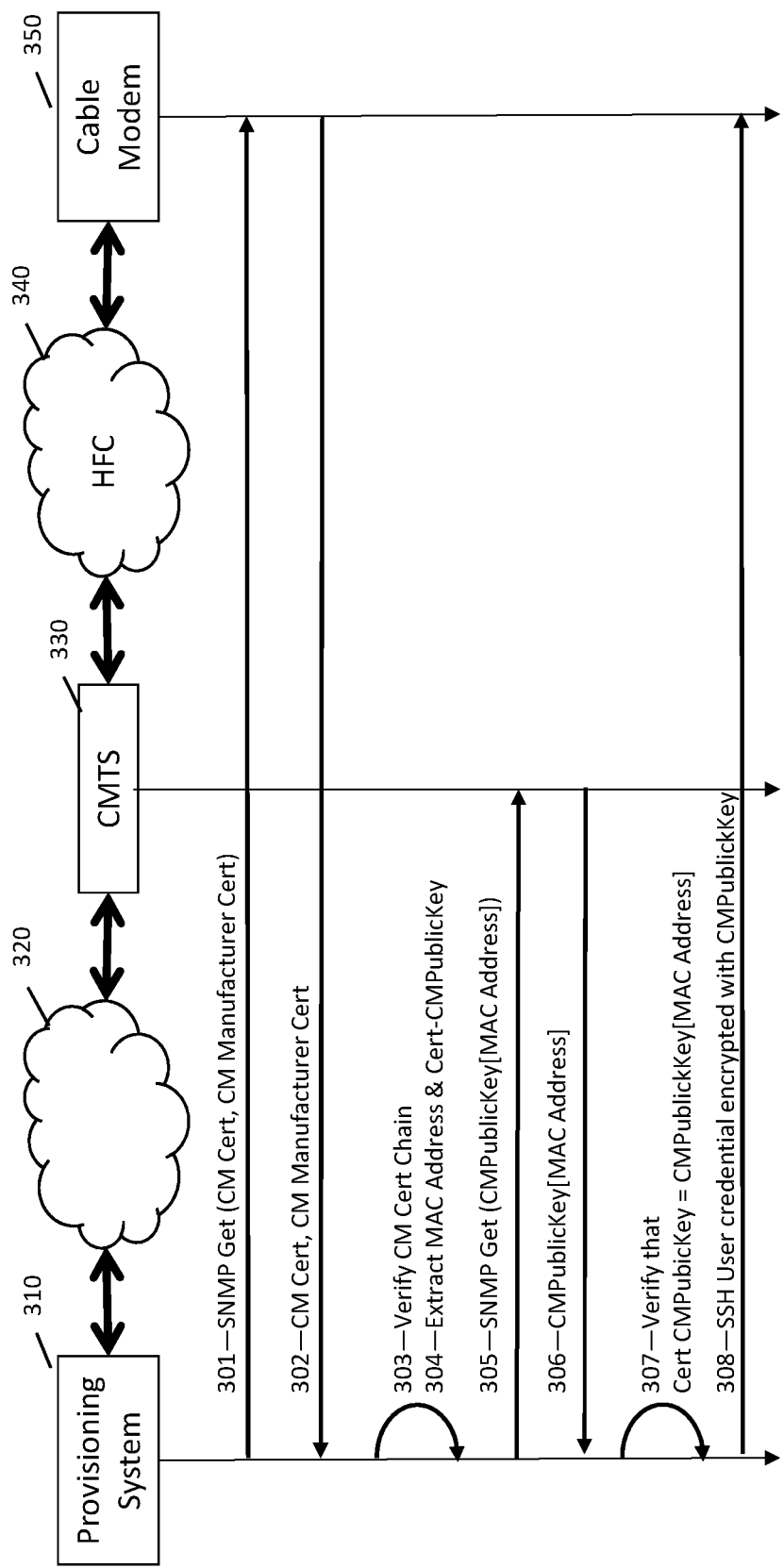
FIG. 3 shows an exemplary communications flow in systems and methods for securely provisioning SSH credentials to CPE.

FIG. 3 illustrates an exemplary embodiment of the methods disclosed herein. A network may comprise an MSO communication device such as a provisioning server 310 connected via an internet network 320 to an intermediate communications device such as a CMTS 330 which is connected via coaxial cable connection 340 to a CM 350. At the outset, the MSO can assume that the network is not secure. The CM comprises a digital certificate, CM Cert that includes a public key, CMPublicKey, and an address, MAC address, that was installed at manufacture. When the CM boots up, it transmits its CMCert to the CMTS. The CMTS verifies the authenticity of the certificate and uses the MAC address and CMPublicKey to establish encrypted communications with the CM over the cable network 340. To establish a secure connection between MSO server 310 and cable modem 350, the MSO server can verify that its communications are directed to the intended CM. The MSO server 310 can send a request 301 for the CM Cert to CM 350 using an SNMP protocol and the CM can respond 302 by sending its certificate(s) to the MSO server. The server can then verify 303 the validity of the CM certificate(s), CM Cert Chain, and extract the MAC address and the CMPublicKey (Cert-CMPublicKey) from the CM Cert. The server can also request 305 the CMPublicKey of CM 350 from the CMTS 320 by sending a SNMP Get command for the CMPublicKey associated with the extracted MAC address. The CMTS can respond 306 by transmitting the CMPublicKey for CM 350 that it received at the time that communications were initialized with CM 350. CMTS 320 will respond with an error if that CM 350 is currently not online sending and receiving packets to/from the CMTS 320. The server 310 can then verify that the extracted Cert CMPublicKey is the same as the CMPublicKey that the CMTS provided and stored in memory. If this is true, then the server 310 can use the CMPublicKey to encrypt a message to CM 350. A remote attacker with stolen CM 350 credentials that is not connected to the Internet through the CMTS 320 will be rejected from receiving SSH credentials.

In general, the CMTS 320 is a router on the path between the MSO back office and CM 350 and here are a couple of ways that the MSO back office can verify the CM 350 connection is through a particular CMTS 320:

If the provisioning server has a dedicated link directly to the CMTS 320 (no routers in between), traffic to/from the CM 350 could be isolated to that link. This could be accomplished by using ACLs (access-control lists) on external network interfaces to block source IP's coming from subnets assigned to CMs rather than their assigned CMTS 320.

The provisioning server could have a secure tunnel (e.g. IPsec or other VPN type) to the assigned CMTS 320 and verify that packets to and from the CM 350 go through the tunnel.

The provisioning server could use traceroute to verify that its path to the CM 350 IP address goes through the assigned CMTS 320. This would not prevent packets from the adversary from using a different path but at least packets towards the CM 350 would be highly likely to go through the assigned CMTS 320.

This encrypted message advantageously comprises log in credentials for a SSH server. The CM may be configured to operate a SSH server using the credentials, which will permit the MSO to log in to the modem to issue commands and upload files that may include software and configuration settings. The CM may also, or alternatively, be configured to use the SSH credentials to log into a MSO server to download digital files, containing for example, software and configuration settings on a defined schedule, for example as a part of the boot up sequence or at defined intervals.

The method can provide enhanced security by, among other things, providing an enhanced assurance that the MSO server communicates the SSH credentials only to the intended CPE device. Suppose one cable modem somewhere was compromised—its device certificate and private key were extracted by an adversary. The adversary intercepts SNMP Get of the BPI+ certificate and responds back with the compromised certificate. The attacker's cable modem may have a different MAC Address and may be in a different MSO network, but this is not detected if the certificate chain validation succeeded. Furthermore, attacker may not be using a cable modem at all and may be impersonating a cable modem from a PC or a general-purpose computer by utilizing a copy of stolen CM credentials. If the MSO validates the certificate chain, finds no problems and proceeds delivering credentials encrypted with the corresponding public key, then the adversary can obtain the SSH credentials used by the MSO to configure its cable modems. Frequently, for convenience an MSO utilizes the same common password as an SSH login credential for all or many of its cable modems. In that case, once a single password has been stolen, it can be utilized to attack and misconfigure many cable modems within the same MSO's networks. Even if that certificate is on a CMTS blacklist, that information may not have been propagated to all CMTSs that belong to the same MSO and may share the same SSH password. However, verifying that the public key used to transmit credentials is the public key of the specific CM at a specific MAC address, i.e., a CMTS lookup of a public key matching CM MAC address, prevents such attacks.

In a DOCSIS context, the CM Public Key is validated by CM's BPI+ certificate chain, and BPI+ certificate contains a MAC Address that can be used to ensure that MSO is talking to the correct cable modem. BPI+ and manufacturer certificates can be easily retrieved by MSO via CM MIB and the MSO can verify the full device certificate chain to make sure its certificate is valid. A Root CA certificate can be hard-coded in the MSO application. The MAC Address is verified by CMTS at layer 2. Then, the MSO needs to verify with the CMTS the MAC address in the BPI+ certificate and that the CM 350 is currently online and connected to the correct CMTS 320. For example, the MSO can retrieve CM public key for that MAC Address and compare with the value in the certificate. The MSO is fully assured that it has the public key that belongs to the correct CM and not an adversary attempting to steal SSH credentials. Even after the particular CM's private key has been stolen, the adversary is limited to utilizing stolen credentials on another cable modem connected to the same CMTS 320 as a legitimate cable modem. Two cable modems with the same MAC Address connected to the same CMTS 320 would interfere with each other and risk detection by the CMTS 320. On the other hand, if legitimate and attacker's cable modem are connected through 2 different CMTSs using the same MAC Address—that should be prevented by MSO's back office system. Furthermore, when an attacker attempts to utilize stolen credentials on a non-DOCSIS connection without a CMTS 320, the server can detect an outside network connection. As will be appreciated, the methods and systems disclosed herein may be generalized and applied to a variety of CPE devices and a variety of network architectures if the principles of the method are implemented.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question (e.g., code that constitutes processor firmware, a protocol stack, a database management system, an operating system, or a combination of one or more of them).

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer (or processor) or on multiple computers (or multiple processors) that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device (e.g., a mobile communications device, a phone, a cable modem, a set-top box, a mobile audio or video player, or a game console, to name just a few).

Computer readable media suitable for storing computer program instructions and data include all forms of non-volatile memory, media and memory devices, including by way of example semiconductor memory devices, e.g., Erasable Programmable Read-Only Memory (EPROM), Electrically Erasable Programmable Read-Only Memory (EEPROM), and flash memory devices; magnetic disks, e.g., internal hard disks or removable disks; magneto optical disks; and Compact Disc Read only Memory (CD ROM) and Digital Versatile Disc Read Only Memory (DVD ROM) disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specific implementation details, these should not be construed as limitations on the scope of any invention or of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing can be advantageous.

What is claimed is:

1. A method for increasing the security of communications between a server and a remotely located network device,
    wherein the server is connected through a first communications medium to an intermediate network device, the intermediate network device is connected through a second communications medium to the remotely located network device, and communications between the server and the remotely located network device pass through the intermediate network device,
    wherein the remotely located network device has an address, a public key, and one or more digital certificates containing the address and public key,
    wherein the intermediate network device is configured to use the address and public key of the remotely located network device to establish communications with the remotely located network device, and
    wherein the remotely located network device comprises a processor configured to transmit, in response to a request, the one or more digital certificates,
    the method comprising:
    the server requesting the one or more digital certificates from the remotely located network device,
    the remotely located network device transmitting the one or more digital certificates to the server,
    the server verifying validity of the one or more digital certificates received from the remotely located network device,
    the server extracting the address and public key of the remotely located network device from the one or more digital certificates,
    the server requesting, from the intermediate network device, the public key of the remotely located network device having the address of the remotely located network device, the intermediate network device transmitting the public key of the remotely located network device having the address of the remotely located network device to the server, the server verifying that the public key of the remotely located network device extracted from the one or more digital certificates matches the public key received from the intermediate network device, and the server sending an encrypted message to the remotely located network device through the intermediate network device, wherein the encrypted message is encrypted using the public key of the remotely located network device.

2. The method of claim 1, wherein the server is a provisioning server, the intermediate network device is a cable modem termination system, and the remote network device is a cable modem located in a customer premises.

3. The method of claim 1, wherein the message from the server to the remote network device comprises credentials for a secure communications protocol.

4. The method of claim 3, wherein the credentials for a secure communications protocol are SSH credentials.

5. The method of claim 2, wherein the message from the provisioning server to the cable modem is encrypted using the cable modem public key and comprises credentials for a secure communications protocol, and wherein the cable modem is configured to operate a secure server using the credentials for receiving configuration settings.

6. The method of claim 5, wherein the credentials for a secure communications protocol are credentials for a SSH server.

7. The method of claim 6, wherein the cable modem comprises a processor configured to operate an SSH server using the credentials for receiving configuration settings and or commands for execution by the processor of the cable modem.

8. An apparatus for communicating with a remotely located network device,
wherein the apparatus is connected through a first communications medium to an intermediate network device, the intermediate network device is connected through a second communications medium to the remotely located network device, and communications between the apparatus and the remotely located network device pass through the intermediate network device,
wherein the remotely located network device has an address, a public key, and one or more digital certificates containing the address and public key,
wherein the intermediate network device is configured to use the address and public key of the remotely located network device to establish communications with the remotely located network device,
wherein the remotely located network device is configured to transmit, in response to a request, the one or more digital certificates,
the apparatus comprising,
a processor, and a memory, communicatively coupled to the processor, the memory storing instructions for carrying out the following procedures:
requesting the one or more digital certificates from the remotely located network device,
receiving from the remotely located network device the one or more digital certificates,
verifying validity of the one or more digital certificates received from the remotely located network device,
extracting the address and public key of the remotely located network device from the one or more digital certificates,
requesting, from the intermediate network device, the public key of the remotely located network device having the address of the remotely located network device,
receiving from the intermediate network device, the public key of the remotely located network device having the address of the remotely located network device,
verifying that the public key extracted from the one or more digital certificates matches the public key received from the intermediate network device, and
sending an encrypted message to the remotely located network device through the intermediate network device, wherein the encrypted message is encrypted using the public key of the remotely located network device.

9. The apparatus of claim 8, wherein the apparatus comprises a provisioning server, the intermediate network device is a cable modem termination system, and the remote network device is a cable modem located in a customer premises.

10. The apparatus of claim 8, wherein the message from the apparatus to the remote network device comprises credentials for a secure communications protocol.

11. The apparatus of claim 9, wherein the credentials for a secure communications protocol are SSH credentials.

12. The apparatus of claim 9, wherein the message from the apparatus to the cable modem is encrypted using the cable modem public key and comprises credentials for a secure communications protocol, and wherein the cable modem is configured to operate a secure server using the credentials for receiving configuration settings.

13. The apparatus of claim 12, wherein the credentials for a secure communications protocol are credentials for a SSH server.

14. The apparatus of claim 13, wherein the cable modem comprises a processor and a memory storing instructions for using the instructions in operating an SSH server for receiving configuration settings and or commands for execution by the processor of the cable modem.

15. A non-transitory computer readable medium comprising instructions operable to cause one or more processors to perform operations, comprising:
requesting one or more digital certificates from a remotely located network device, wherein the remotely located network device has an address, a public key, and the one or more digital certificates contain the address and public key,
receiving from the remotely located network device the one or more digital certificates,
verifying validity of the one or more digital certificates received from the remotely located network device,
extracting an address and public key of the remotely located network device from the one or more digital certificates,
requesting, from an intermediate network device, a public key of the remotely located network device having the address of the remotely located network device, wherein the apparatus is connected through a first communications medium to the intermediate network device, the intermediate network device is connected through a second communications medium to the remotely located network device, and communications between the apparatus and the remotely located network device pass through the intermediate network device, receiving from the intermediate network device, the public key of the remotely located network device having the address of the remotely located network device, verifying that the public key extracted from the one or more digital certificates matches the public key received from the intermediate network device, and sending an encrypted message to the remotely located network device through the intermediate network device, wherein the encrypted message is encrypted using the public key of the remotely located network device.

16. The non-transitory computer readable medium of claim 15, wherein the message from the apparatus to the remote network device comprises credentials for a secure communications protocol.

17. The non-transitory computer readable medium of claim 16, wherein the credentials for a secure communications protocol are SSH credentials.

18. The non-transitory computer readable medium of claim 15, wherein said instructions are operable to cause processors comprised within a provisioning server to carry out said operations, the intermediate network device is a cable modem termination service device, the remotely located network device is a cable modem, the public key is a cable modem public key, and said message is encrypted using the cable modem public key and comprises credentials for a secure communications protocol.

19. The non-transitory computer readable medium of claim 18, wherein the credentials for a secure communications protocol are credentials for a SSH server.

20. The non-transitory computer readable medium of claim 19, wherein the operations further comprise using the credentials to log in to a SSH server operated by the cable modem and transmitting configuration settings and/or commands for execution by a processor of the cable modem.

* * * * *